United States Patent
Castagner et al.

(10) Patent No.: US 8,072,442 B2
(45) Date of Patent: Dec. 6, 2011

(54) ELECTRICALLY SWITCHABLE FIELD OF VIEW FOR EMBEDDED LIGHT SENSOR

(75) Inventors: Jean-Luc Laurent Castagner, Lavaur (FR); Alexandra Baum, Oxford (GB); Jing Yu, Didcot (GB); James Rowland Suckling, Surrey (GB); Christopher James Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/702,972

(22) Filed: Feb. 9, 2010

(65) Prior Publication Data

US 2011/0193822 A1 Aug. 11, 2011

(51) Int. Cl.
*G06F 3/42* (2006.01)
(52) U.S. Cl. ........................................ 345/175; 345/176
(58) Field of Classification Search .................... 345/55, 345/72, 87–104, 173–178, 204; 348/252, 348/332; 349/12, 14, 61, 106, 156, 1, 11, 349/193; 359/265, 267, 601–604, 453, 499
See application file for complete search history.

(56) References Cited

U.S. PATENT DOCUMENTS

| | | | | |
|---|---|---|---|---|
| 3,675,988 | A * | 7/1972 | Soref | 349/74 |
| 6,650,472 | B1 * | 11/2003 | Adachi et al. | 359/453 |
| 6,661,495 | B1 * | 12/2003 | Popovich | 349/193 |
| 6,903,716 | B2 * | 6/2005 | Kawabe et al. | 345/99 |
| 6,943,947 | B2 * | 9/2005 | Adachi et al. | 359/453 |
| 2001/0055008 | A1 * | 12/2001 | Young et al. | 345/204 |
| 2003/0197817 | A1 * | 10/2003 | Class-Dieter et al. | 349/61 |
| 2004/0032638 | A1 * | 2/2004 | Tonar et al. | 359/265 |
| 2005/0219188 | A1 * | 10/2005 | Kawabe et al. | 345/94 |
| 2006/0017860 | A1 * | 1/2006 | Adachi et al. | 349/1 |
| 2007/0133090 | A1 * | 6/2007 | Adachi et al. | 359/453 |
| 2007/0285843 | A1 * | 12/2007 | Tran | 360/245.9 |
| 2008/0068520 | A1 * | 3/2008 | Minikey et al. | 349/11 |
| 2008/0198456 | A1 * | 8/2008 | Sharp | 359/499 |
| 2008/0252824 | A1 * | 10/2008 | Kadowaki et al. | 349/96 |
| 2009/0128746 | A1 | 5/2009 | Kean et al. | |
| 2009/0141022 | A1 * | 6/2009 | Kimpe | 345/419 |
| 2009/0207153 | A1 * | 8/2009 | Kunii et al. | 345/175 |

FOREIGN PATENT DOCUMENTS

| | | |
|---|---|---|
| WO | 2006/132384 | 12/2006 |
| WO | 2007/058924 | 5/2007 |
| WO | 2009/002446 | 12/2008 |

* cited by examiner

*Primary Examiner* — Prabodh Dharia
(74) *Attorney, Agent, or Firm* — Renner, Otto, Boisselle & Sklar, LLP

(57) ABSTRACT

A display device for detecting light includes a display surface, at least one light sensitive element arranged behind the display surface, and a liquid crystal element arranged between the display surface and the at least one light sensitive element. The liquid crystal element is operative to polarization shift light incident on the at least one light sensitive element based on an orientation of the plurality of molecules. The display device further includes at least one electrode operative to change an orientation of the plurality of molecules. The at least one electrode is patterned to define a geometry of at least one field of view of the at least one light sensitive element. A controller is electrically coupled to the at least one electrode, wherein the controller is configured to apply a voltage to the at least one electrode to effect selection of the at least one field of view.

30 Claims, 13 Drawing Sheets

ELECTRICALLY SWITCHABLE FIELD OF VIEW FOR EMBEDDED LIGHT SENSOR

TECHNICAL FIELD

The present invention relates to a display panel. In particular, the present invention relates to the detection of light incident within electrically selectable fields of view upon an array of light sensors embedded within electronic layers of the display panel. Such a panel may be applied, for example, to the three-dimensional detection of the position of one or more user-controlled stylus/fingertips/scattering objects above or below the display panel's surface. The panel may also be applied, for example, to increase optical scanning resolution without increasing the number of embedded light sensors in the array. The panel may also be applied, for example, to achieve color scanning without increasing the number of embedded light sensors in the array and without loss of resolution. Further, the panel may be applied, for example, to acquire and simultaneously display stereoscopic images.

BACKGROUND OF THE INVENTION

WO2006132384 (Sharp Kabushiki Kaisha Corp.) This publication describes a display having switchable wide and narrow fields of view that make use of a variation in intensity with viewing angle and control a grey level curve of the display. In particular, the invention relates to electrical control of fields of view of light emitted from a display using intrinsic properties of the liquid crystal. This publication does not disclose the use of an in-cell polariser nor is the display implemented with an embedded sensor array.
WO2009/002446A1 (Chiefway Engineering Co. Ltd)

This publication describes a light-regulation membrane that uses polymer dispersed liquid crystal films sandwiched between polymer compound and a liquid crystal layer sandwiched in-between two conductive layers. In this invention, a field of view is not created through specific patterning of one of the ITO layers.
WO2007/058924 (Planar Systems Inc.)

This invention describes a display having embedded light sensors. One of the embodiments shows an LCD arrangement where the rear polariser is placed above the electronic layers. This is in contrast to the common position of the rear polariser which is below the electronics. In the invention, a field of view is not created on a sensor through specific patterning of one of the ITO layers.

There is an increasing interest in touch-sensitive panels, as they provide a simplified means of interaction with the user through the measurement of two-dimensional positioning of user-controlled objects on the display panel surface.

More particularly, the implementation of electrically switchable functions embedded with the touch-sensitive panel is of great advantage as it provides a simple efficient way to combine different functions into one display configuration.

Among these functions, three-dimensional detection of objects on top of the display, adaptation of display intensity to ambient light levels and document/fingerprint scanning generates a great interest for embedded light sensor display manufacturers.

SUMMARY OF THE INVENTION

The present invention provides a design for an optical structure embedded within electronic layers of a display so as to effect electrical switching of at least one field of view for light incident upon an array of light sensors embedded within the display. In this, an in-cell polarising element is inserted within the liquid crystal cell of the display and at least one of the liquid crystal electrodes is patterned in a manner that defines a geometry of at least one field of view.

According to one aspect of the invention, a display device for detecting light includes: a liquid crystal display element including at least one electrode patterned thereon; and at least one light sensitive element arranged behind the liquid crystal display element, wherein the at least one electrode, in conjunction with a voltage applied to the liquid crystal display element via the at least one electrode, is operative to change an optical transmission characteristic of the liquid crystal display element to define at least one field of view of the at least one light sensitive element relative to light transmitted through the liquid crystal display element, and wherein the at least one electrode is patterned to define a geometry of the at least one field of view of the at least one light sensitive element.

According to one aspect of the invention, the liquid crystal display element is operative to polarization shift light incident on the at least one light sensitive element According to one aspect of the invention, the device further includes a controller electrically coupled to the at least one electrode, the controller configured to apply a voltage to the at least one electrode to effect selection of the at least one field of view.

According to one aspect of the invention, the device further includes an in-cell polarizing element arranged in the liquid crystal element.

According to one aspect of the invention, the liquid crystal element is arranged over the in-cell polarizing element.

According to one aspect of the invention, the in-cell polarizing element is arranged within the liquid crystal element.

According to one aspect of the invention, the device further includes at least one electronic layer, wherein the at least one light sensitive element is embedded within the at least one electronic layer.

According to one aspect of the invention, the device further includes a polarizing element arranged over the liquid crystal element, the polarizing element configured to linearly polarize light incident on the at least one light sensitive element.

According to one aspect of the invention, the device further includes a polarizing element arranged under the liquid crystal element, the polarizing element configured to linearly polarize light incident on the at least one light sensitive element.

According to one aspect of the invention, the at least one electrode is arranged such that a position and shape of the at least one electrode relative to the at least one light sensitive element induces the field of view of the at least one light sensitive element toward a predetermined direction.

According to one aspect of the invention, when the liquid crystal element is in a first state, incident polarized light is either transmitted through the liquid crystal element and impinges on a surface of the at least one light sensitive element, or the incident polarized light blocked from passing through the liquid crystal element, wherein the at least one light sensitive element generates a scaled signal corresponding to a light input pixel.

According to one aspect of the invention, the at least one electrode is patterned in a rectangular, square, circular, or elliptical shape.

According to one aspect of the invention, the at least one electrode is a ground electrode and positioned adjacent to an edge of another electrode.

According to one aspect of the invention, the ground electrode is patterned in a rectangular, square, circular, or elliptic shape.

According to one aspect of the invention, the at least one electrode comprises a plurality of electrodes patterned in distinct regions above the at least one light sensitive element.

According to one aspect of the invention, the distinct regions are electrically isolated from one another, and distinct fields of view of the at least one light sensitive element are electrically selectable based on a voltage applied to one or more of the distinct regions.

According to one aspect of the invention, switching of each field of view is made on a pixel-by-pixel basis.

According to one aspect of the invention, the at least one light sensitive element comprises a color filter.

According to one aspect of the invention, adjacent light sensitive elements of the plurality of light sensitive elements have fields of view that co-extend to fields of view of adjacent light sensitive elements.

According to one aspect of the invention, the device further includes an optical element arranged over the at least one light sensitive element, the optical element configured to modify a direction of the field of view of the at least one light sensitive element to be normal to a surface of the display device.

According to one aspect of the invention, the optical element comprises a lens array.

According to one aspect of the invention, the device further includes an optical element arranged over the at least one light sensitive element, the optical element configured to modify a direction of the field of view of the at least one light sensitive element to be at an angle to the normal of a surface of the display device.

According to one aspect of the invention, the optical element comprises a lens.

According to one aspect of the invention, the light sensitive element is responsive to non-homogeneous light.

According to one aspect of the invention, the at least one electrode is patterned such that only incident light from a distinct field of view of the at least one light sensitive element impinges on a predetermined area of the at least one light sensitive element, and the incident light is contained within a total internal refraction limit such that the incident light does not impinge on another part of the at least one light sensitive element associated with a different field of view.

According to one aspect of the invention, the device further includes a reflective electrode arranged over the at least one electrode, the reflective electrode patterned to include an aperture arranged over the at least one electrode.

According to one aspect of the invention, the device further includes an infrared light source arranged below the at least one light sensitive element so as to transmit infrared radiation through the liquid crystal element and illuminate objects above a surface of the display device such that scattered infrared radiation is incident on the at least one light sensitive element.

According to one aspect of the invention, the at least one electrode is arranged over the at least one light sensitive element.

According to one aspect of the invention, the device further includes a light source, wherein the at least one light sensitive element is arranged between the light source and the liquid crystal display element.

According to one aspect of the invention, a display device for detecting light incident within an electrically selectable field of view includes: at least one electronic layer including at least one light sensitive element; a liquid crystal element arranged over the at least one light sensitive element and including a plurality of molecules, wherein the liquid crystal element is operative to polarization shift light incident on the at least one light sensitive element based on an orientation of the plurality of molecules; and at least one electrode operative to change an orientation of the plurality of molecules, the at least one electrode patterned to define a geometry of a field of view of the at least one light sensitive element, wherein light passing through the at least one electronic layer undergoes polarization-by-reflection, and a field of view of the at least one light sensitive element is bounded by the angular dependence of the polarization-by-reflection.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
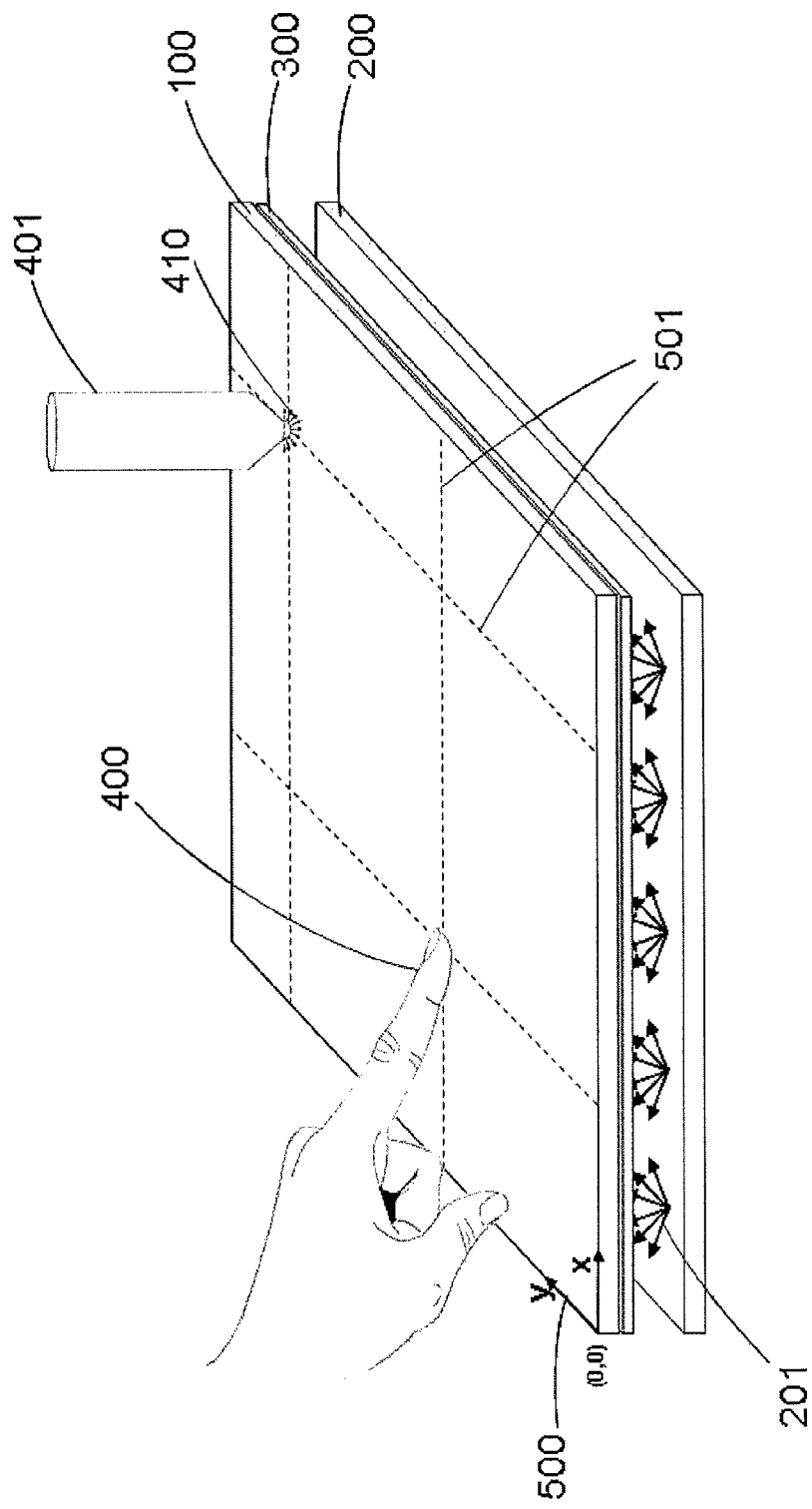
FIG. 1 illustrates a two-dimensional context for optical touch-sensitive panels.

FIG. 1 illustrates a two-dimensional context for touch-sensitive panels using optical means for the two-dimensional detection of the position of objects on the LCD display panel 100 surface. In this type of system, one or more user-controlled light scattering objects such as a finger 400 or object 401 interact with an array of optical sensors embedded within electronic layers 300 of a display panel 100. The interaction is by means of light scattered by the objects 400 or 401 through the display panel 100 to electronic layers 300 as a result of being illuminated by a backlight element 200 emitting light 201 through the semi-transparent electronic layers 300 and display panel 100. Alternatively, one or more user-controlled light emitting objects such as 410 may also interact directly with an array of optical sensors embedded within electronic layers 300.

In this type of light sensor array embedded within electronic layers 300, multiple light scattering or emitting objects 400, 401, 410 may simultaneously interact optically with the electronic layers 300. The objects may be spatially localised on the display panel 100 surface relative to a reference or coordinate system 500 (having axes 501) as distinct pattern entities from a pixelated image. Each pixel then represents a scaled signal generated by one or more light sensors embedded in electronic layers 300.

Electronic layers 300 may also comprise various layers that modify the passage of scattered or emitted light from one or more light scattering or light emitting objects through to one or more light sensors in a suitable manner with a desired effect.

In some cases, electronic layers 300 may incorporate layers that will define an optical configuration allowing the differentiation between a scattering/emitting object in contact with LCD display panel surface 100 and a light scattering or light emitting object hovering above LCD display panel surface 100.

Figure 2:
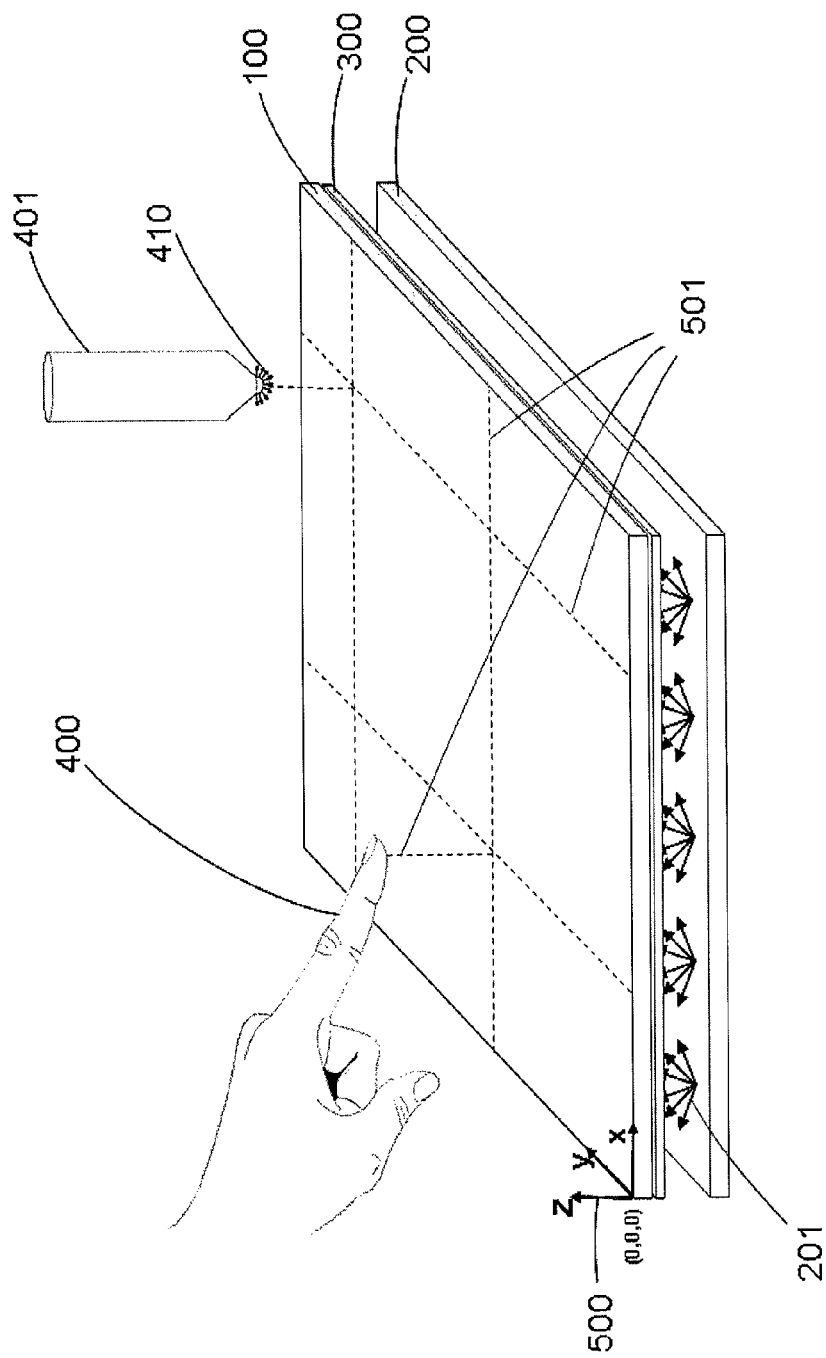
FIG. 2 illustrates a three-dimensional context for optical touch-sensitive panels.

FIG. 2 illustrates a problem of three-dimensional detection of the position of one or more user-controlled light scattering objects such as a finger 400 or object 401. The objects interact with an array of optical sensors embedded within electronic layers 300 of the display panel 100 by scattering light through the display panel 100 to the electronic layers 300 (e.g., backlight element 200 illuminates the electronic layers and the light passes through both the semi-transparent electronic layers and the display panel surface, where it interacts with the objects so as to scatter back toward the panel and electronic layers). Alternatively, one or more user-controlled light emitting objects such as 410 may also interact directly with an array of optical sensors embedded in electronic layers 300.

In this type of light sensor array embedded in electronic layers 300, multiple objects may simultaneously interact optically with the electronic layers 300. The objects can be spatially localised above the display panel 100 surface relative to a three-dimensional reference system 500 as distinct pattern entities from a pixelated image, each pixel of which represents a scaled signal generated by one or more light sensors embedded in the electronic layers 300. Electronic layers 300 may also comprise various layers that modify the passage of scattered or emitted light from scattering or emitting objects through to one or more light sensors in a suitable manner with a desired effect.

If the surface of the LCD display panel 100 is made of a flexible material that allows for local deformations when subjected to pressure effected by one or more light scattering or light emitting objects, the light sensor array embedded in the electronic layers 300 may also provide three-dimensional detection of the position of one or more light scattering or light emitting objects that effect pressure on or below the LCD display panel 100 surface. This can result in negative positional information relative to the axis Z of three-dimensional reference system 500, normal to the LCD display panel 100 surface.

First Embodiment of the Invention

Figure 3:
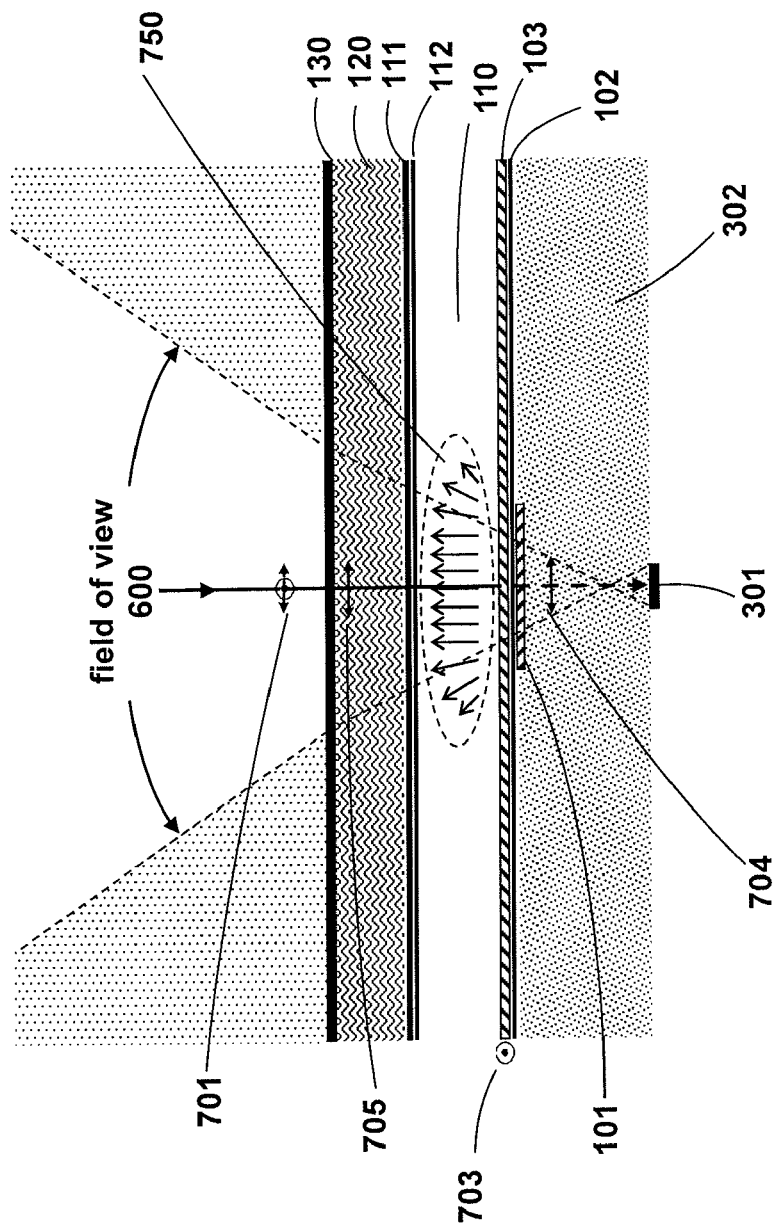
FIG. 3 is a cross-sectional view of exemplary electronic layers that constitute a first embodiment of the invention and field of view created on a sensor.

FIG. 3 illustrates a first embodiment in accordance with the present invention. Transmitted light 704 which is incident on an embedded light sensitive element 301 has been polarisation shifted by a liquid crystal element 110 after being polarised 705 by polarising element 130, located on the top glass substrate 120. The liquid crystal element 110 may be, for example, but not limited to, a twisted nematic (TN) configuration.

An in-cell polarising element 103 absorbs polarised light according to its respective absorption axis 703. Within a liquid crystal display panel, alignment of the molecules is required at each of the internal surfaces to facilitate the correct function of the display. This alignment is achieved by the alignment layers 102 and 112. Polarising element 103 may also be used as an alignment layer for liquid crystal element 110 as it maintains the alignment created by layer 102. The alignment of the liquid crystals is maintained on the opposite surface by alignment layer 112. In-cell polarising element 103 may be constituted, for example, of a combination of a reactive mesogen and a dichroic dye. In-cell polariser may also be constituted, for example, by the electronic layers 302, for polarisation selective transmission effects which are induced through multiple successive reflections within the various electronic layers 302.

Depending on the orientation of the absorption axis 703 relative to the absorption axis of polarising element 130, various levels of absorption of the light incident on the in-cell polariser 705 can be achieved.

In effect, this system constitutes a light valve when using ITO electrode elements 101 and 111 to change the orientation of the molecules of liquid crystal element 110, having the effect of inducing a change in the polarisation of the incident light 701 from within field of view 600 going through the various electronic layers. According to the switching state of liquid crystal element 110, incident light 701 is either absorbed or transmitted by polarising element 103. When transmitted, polarised light 704 impinges on light sensitive element 301 and generates a scaled electrical signal that characterizes a light input pixel in the display. When absorbed, light incident on the in-cell polariser 705 does not impinge on light sensitive element 301 and therefore does not generate any signal. The light input pixel is therefore in its dark state.

In the case where polarising elements 130 and/or 103 are not ideal polarisers, some amount of residual polarisation is maintained in the polarisation-shifted incident light, having the effect of generating a scaled electrical signal that characterizes the dark state of the light input pixel.

ITO electrode 101 is patterned such that electric field 750 between ITO electrodes 111 and 101 induces a local change in the orientation of the molecules of liquid crystal 110 to effect a polarisation change in the incident light 705. Thus, field of view 600 is dependent on the extent of patterned ITO electrode 101 and the relative position of light sensitive element 301.

Switching liquid crystal element 110 to a voltage potential that induces a local change in the orientation of the molecules will affect the transmission of incident light 701, 705 on light sensitive element 301 when polarising elements 103 and 130 have cross-aligned polarising directions. When polarising elements 103 and 130 have parallel transmission axes, switching liquid crystal element 110 will effect reflection or absorption (depending on the type of polarising element 103) of incident light 701, 705. When polarising elements 103 and 130 have polarising directions that are neither identical nor cross-aligned, switching liquid crystal element 110 will effect a combination of both transmission and reflection/absorption. Any of these configurations can be implemented in any of the embodiments in accordance with the present invention.

ITO electrode 101 may be patterned in a rectangular, square, circular, elliptic or arbitrary shape in a manner suitable with a desired effect. Patterned ITO electrode 101 may also be positioned such that its shape and position relative to light sensitive element 301 induce a field of view 600 oriented toward a preferred direction. Patterned ITO electrode 101 may also be patterned and/or positioned regularly or irregularly within an array of embedded light sensitive elements 301 in a manner suitable with a desired effect.

In this embodiment and all others in accordance with the present invention, ITO electrode 101 may be patterned in a manner suitable with a desired effect and ITO electrode 111 may be uniformly deposited (un-patterned). Alternatively, ITO electrode 111 may be patterned in a manner suitable with a desirable effect and ITO electrode 101 uniformly deposited. Additionally, both ITO electrodes 101 and 111 may be patterned in a manner suitable with a desirable effect or both ITO electrodes 101 and 111 may be uniformly deposited.

In this embodiment and in all others in accordance with the present invention, field of view 600 may be more clearly defined by implementing the electronic layer structure or the display surface with a patterned mask. In the patterned configuration, less precision is needed on the patterning of ITO electrode 101 or 111. This, however, is not applicable when multiple fields of view such as described, for example, in embodiment 3, are in close proximity or even overlap.

In all embodiments in accordance with the present invention, polarising element 103 may be constituted with a material of which the absorption/reflection spectrum encompasses the infra-red, visible and ultra-violet wavelength range or any specific part of it only.

Polarising element 103 may be constituted such that its spectral response is specific to one or more wavelength ranges, which may be monochromatic or polychromatic, this being defined by a general consensus related to the spectral width of each of the individual wavelength ranges.

The embodiment herein described may be used also, for example, as a two-colour state measurement within the fields of view of the light sensitive element 301, when switching.

In all embodiments in accordance with the present invention, polarising element 103 may be uniformly deposited or patterned in a manner suitable with a desirable effect. Such may be the case, for example, to create a field of view switchable in dependence on the ambient light level by patterning polarising element 103 in a manner such that light incident on light sensitive element 301 is confined within the total internal reflection boundary of the arrangement comprised by the various electronic layers and the relative position of light sensitive element 301.

In use, the output of the light sensor may represent the measurement of the intensity of light incident on light sensitive element 301 when the polarising element 103 is driven to one state. Alternatively and more generally, the output of the light sensor may represent a function of two or more simultaneous or sequential measurements of the intensity of the light incident on light sensitive element 301 when the polarising element 103 is driven to two or more corresponding states.

All embodiments in accordance with the present invention may be applied to any type of liquid crystal display, having an active or a passive matrix for addressing the pixels, or liquid crystal on silicon (LCoS).

Embodiment 2

Figure 4:
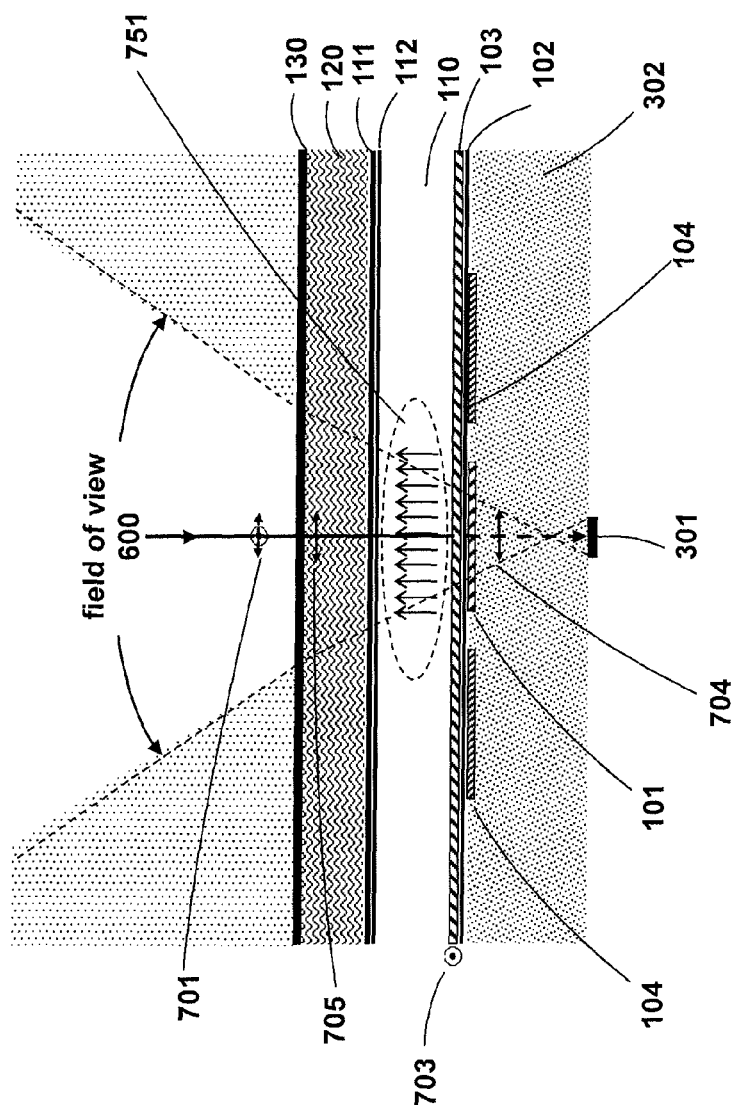
FIG. 4 is a cross-sectional view of exemplary electronic layers that constitute a second embodiment of the invention and field of view created on a sensor.

FIG. 4 illustrates another embodiment in accordance with the present invention. In this embodiment, patterned ITO grounded electrodes 104 are positioned to the edge of patterned ITO electrode 101. This sharpens the local electric field 751 gradient induced by ITO electrodes 101 and 111 in order to more precisely define the active volume of liquid crystal element 110. This has the effect of more precisely defining the field of view 600.

ITO grounded electrode 104 may be patterned in a rectangular, square, circular, elliptic or arbitrary shape in a manner suitable with a desired effect. Patterned ITO grounded electrode 104 may also be patterned and/or positioned regularly or irregularly within an array of embedded light sensitive elements 301 in a suitable manner with a desired effect. Patterned ITO grounded electrode 104 may be used in any of the embodiments in accordance with the present invention to sharpen the local electric field 751 induced by ITO electrodes 101 and 111.

Embodiment 3

Figure 5A:
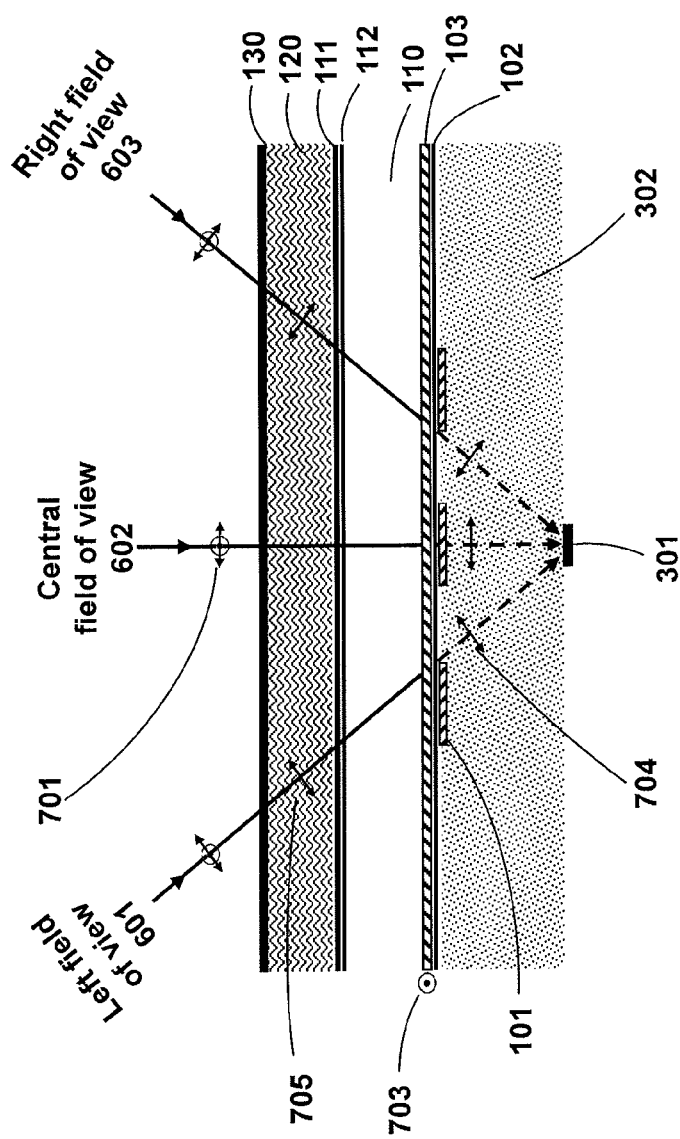
FIG. 5a is a cross-sectional view of exemplary electronic layers that constitute a third embodiment of the invention and left, central and right electrically switchable fields of view created on a sensor.

FIG. 5a illustrates another embodiment in accordance with the present invention. In this embodiment, patterned ITO electrode 101 is patterned in distinct regions (e.g., discrete regions that may be electrically isolated from one another) on top of light sensitive element 301. Each of the regions is electrically connected to different voltages, resulting in electrically switchable distinct fields of view from which incident light impinges on light sensitive element 301.

In the embodiment and all other embodiment using more than one switchable field of view, the relative directions of the various fields of view may be set in a plane from each other or out of plane from each other. Thus, patterned ITO electrode 101 may be arranged in such configurations that create specific fields of view, such as 601, 602 or 603, in order to implement the display panel with optical functions using different fields of view. Such may be the case, for example, for implementing an electrically switchable ambient light shield that would enable enhanced contrast ratio for fingerprint scanning in high ambient light levels by blocking any unwanted incident light from reaching light sensitive element 301.

Figure 5B:
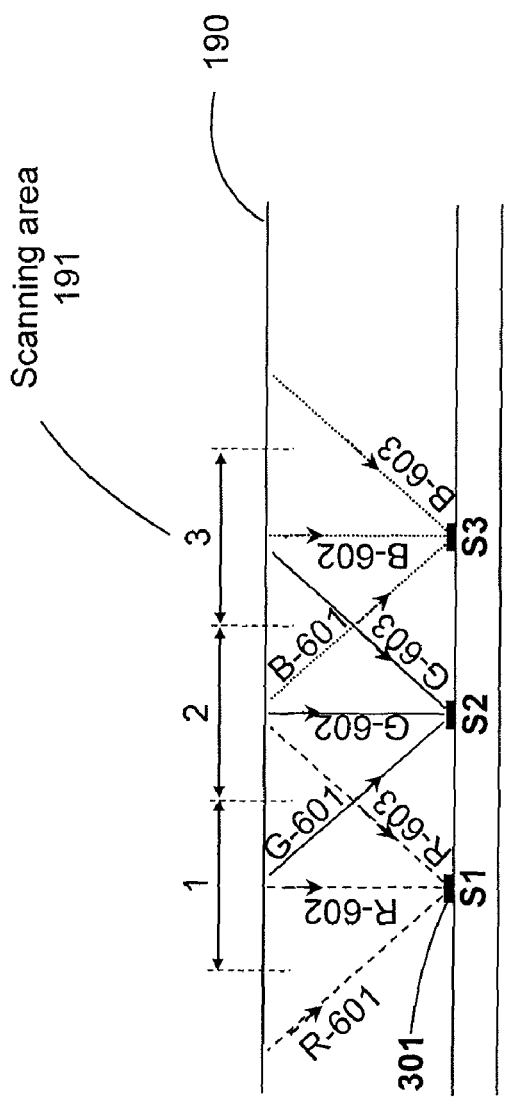
FIG. 5b is a simplified cross-sectional view of exemplary electronic layers that constitute a third embodiment of the invention and left, central and right electrically switchable fields of view created on the sensor implemented with red, green and blue colour filters.

Such may be the case also, for example, for implementing a colour scanning function by de-convolving rows of adjacent light sensitive element 301 having respective red, green and blue colour filters (either located on the top glass substrate 120 or deposited within electronic layers 302) and overlapping fields of view. In this, field of view 601 for light sensitive element 301 endowed with a blue colour filter may be configured such that its relative scanning area overlaps that of the field of view 602 for light sensitive element 301 endowed with a green colour filter. Similarly, field of view 603 for light sensitive element 301 endowed with a red colour filter may be configured such that its relative scanning area overlaps that of the field of view 602 for light sensitive element 301 endowed with a green colour filter. In such a manner, colour scanning can be achieved without loss of resolution. This is illustrated in FIG. 5b where scanning areas 191, located on the plane 190 of the object to be scanned, are denominated as 1, 2 and 3 scatter or emit light onto light sensitive elements 301 denominated as S1, S2 and S3, thus generating a scaled electrical signal from each which can be termed as I1, I2 and I3 respectively. In this particular case, scaled electrical signal I2 is a weighted compound of scattered or emitted light from scanning areas 1, 2 and 3. Light sensitive elements 301 denominated as S1, S2 and S3 may be covered with red, green and blue colour filters respectively or be respectively made of light sensitive materials exhibiting sensitivity in the red, green and blue wavelength range. As each adjacent light sensitive element 301 possesses fields of view (for example G-602) that co-extend to fields of view of its neighbouring counterpart implemented with a different colour filtering (for example R-603 and B-601), each light sensitive element 301 may therefore be used to infer the red, green and blue intensity component scattered or emitted from each scanning area.

Inference of the scanning areas 191 red, green and blue colour components can then be obtained by processing a simple de-convolution algorithm. A priori knowledge of the respective fields of view and colour filters characteristics can be used to process the de-convolution algorithm, although this can be accomplished without a priori knowledge using a calibration scheme to obtain the system transfer function.

Such may be the case also, for example, for implementing an optical depth sensing function that uses oblique incident light as described in GB0909452.5, in conjunction with an electrically switchable ambient light shield and an enhanced resolution scanner. The contents of GB0909452.5 is hereby incorporated by reference in its entirety.

In this embodiment and all others in accordance with the present invention, any number or shape of fields of view may be considered and actuated either independently from each other or simultaneously or any combination of these.

In this embodiment and all others in accordance with the present invention, liquid crystal 110 related to a specific or all fields of view may be activated by a voltage differential applied on ITO electrodes 101 and 111. The differential may be between a minimum value and a maximum value related to the deactivation and activation states, respectively, of the liquid crystal 110 such that any amount of polarisation shift may be induced on the incident light impinging on the system.

In all embodiments in accordance with the present invention, the switching of each field of view may be addressed individually on each pixel of the display (e.g., on a pixel-by-pixel basis), collectively on all pixels of the display or as a combination of both individually and collectively.

Figure 5C:
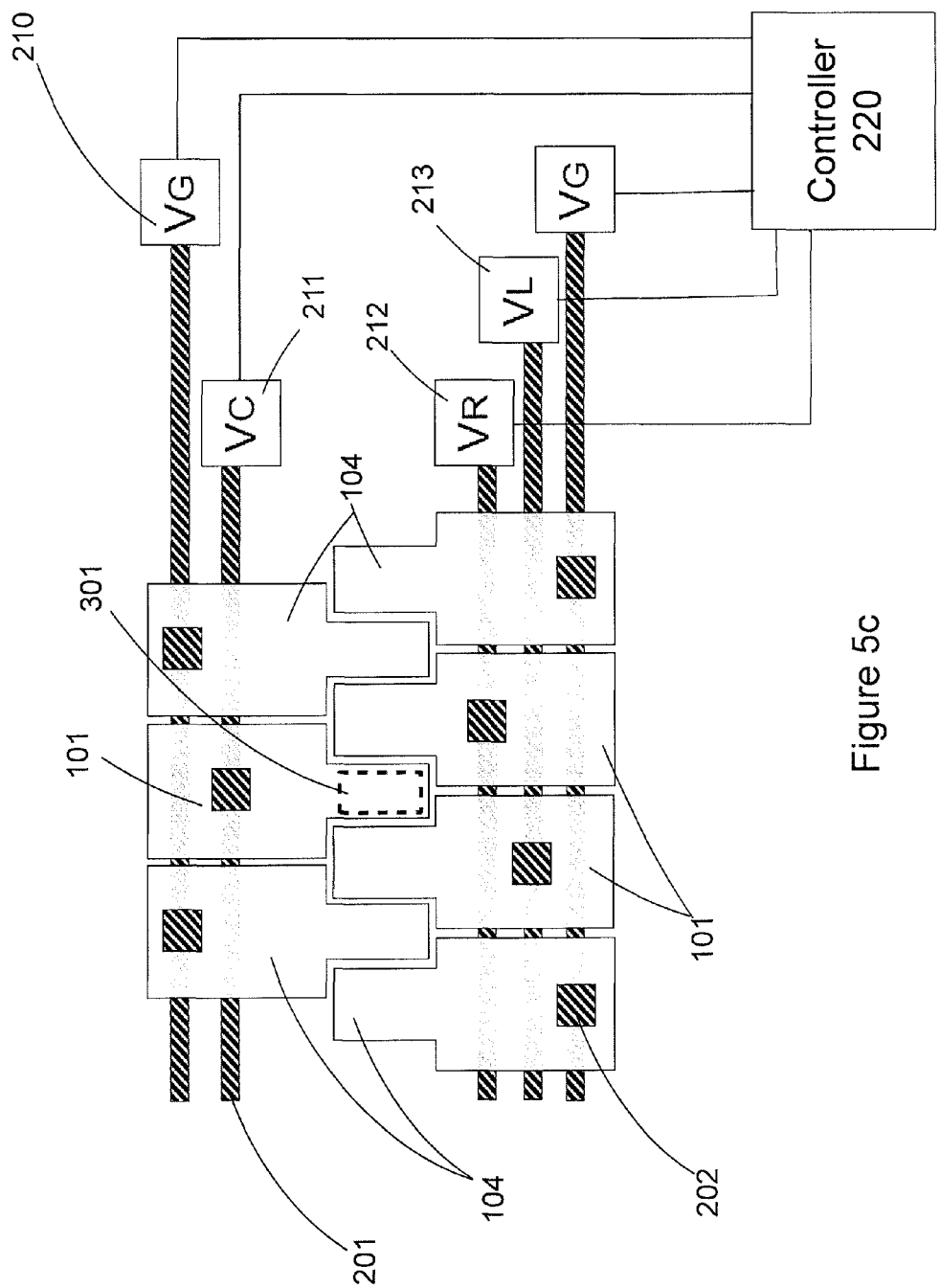
FIG. 5c illustrates an example of ITO patterning to generate three distinct fields of view and the sharpening of the local electric field within the liquid crystal layer.

When addressing each field of view individually, added electronics are required for each pixel to operate the switching of field of view upon light sensing element 301, while added electronics are not required for each pixel to operate the switching of field of view upon light sensing element 301 when addressing each field of view collectively or as a combination of collectively and individually. FIG. 5c illustrates an example of ITO patterning to generate three distinct fields of view such as illustrated in FIG. 5a and the sharpening of the local electric field 751 such as described in FIG. 4. In this example, three ITO patterned regions 101 are connected to different voltages VR 212, VL 213 and VC 211 through lines 201 via connector 202 to create fields of view 601, 602 and 603 on light sensitive element 301 such as described in FIG. 5a. Other ITO patterned regions 104 are connected to ground voltage VC 210 through lines 201 via connector 202 to sharpen the local electric field 751 such as described in FIG. 4. Also shown in FIG. 5c is a controller 220 for applying a voltage to the ITO electrodes. The controller 220 may be configured, for example, to apply different voltages to the electrodes so as to select one or more fields of view.

Embodiment 4

Figure 6A:
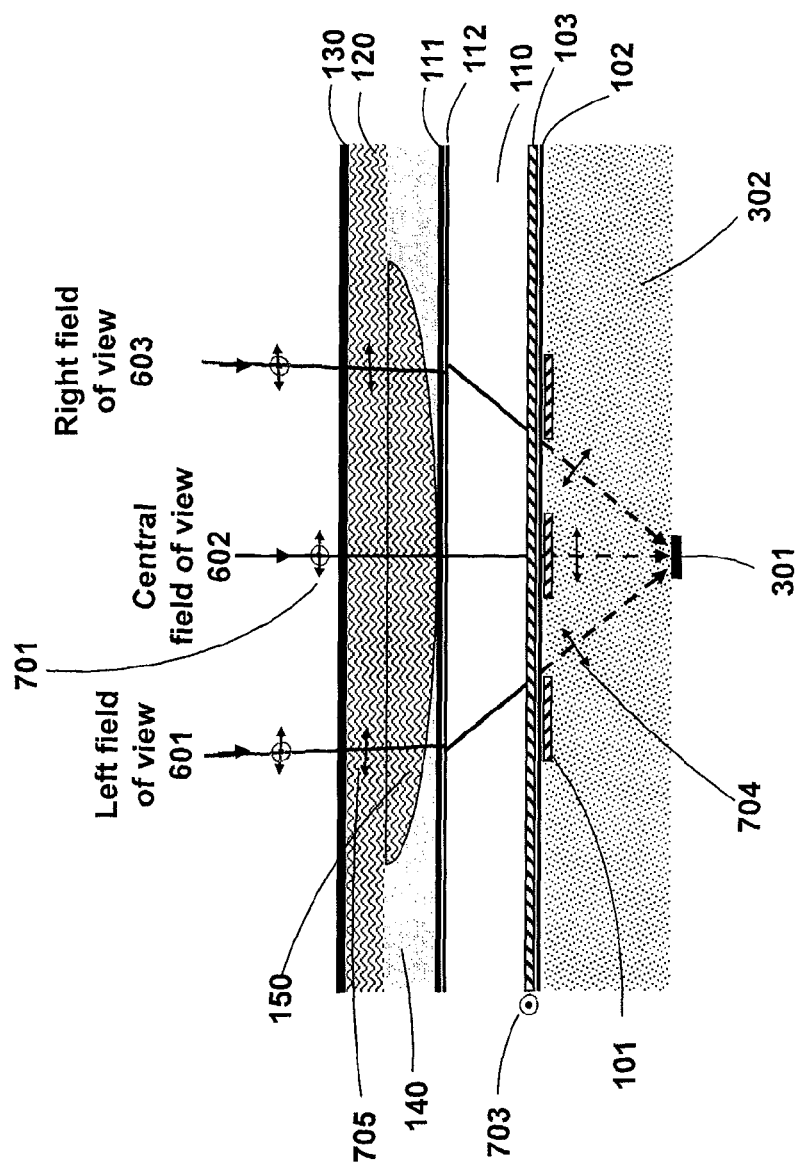
FIG. 6a is cross-sectional view of exemplary electronic layers that constitute a fourth embodiment of the invention and left, central and right electrically switchable collimated fields of view created on a sensor.
Figure 6B:
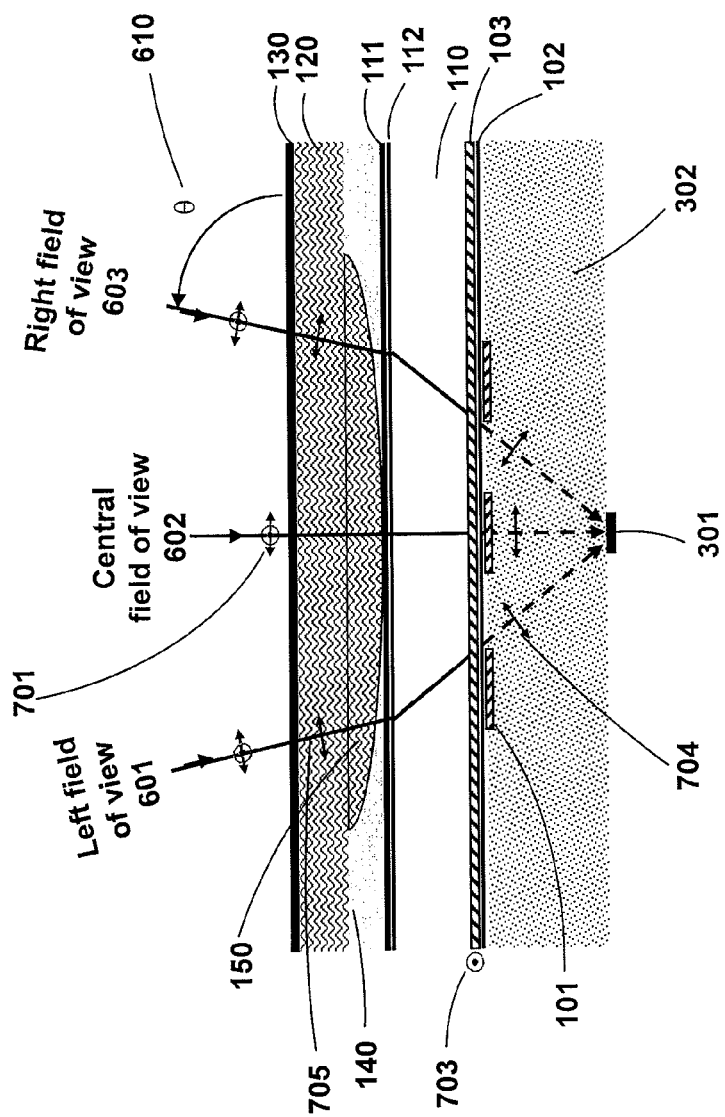
FIG. 6b is a cross-sectional view of exemplary electronic layers that constitute a fourth embodiment of the invention and left, central and right electrically switchable fields of view created on a sensor for acquisition of stereoscopic images.

FIGS. 6a and 6b illustrates another embodiment in accordance with the present invention. In FIG. 6a, the configuration of embodiment 3 is implemented with optical element 150, for example a lens array, placed on top of light sensitive element 301 to modify the fields of view 601, 602 and 603 such that their direction is normal to the display surface. The advantage of this configuration is to make the scanning area for fields of view 601, 601 and 603 independent of the top glass substrate 120 thickness.

In this embodiment, optical element 150 may be constituted by an array of refracting or diffracting elements such as a prism arrangement, a refracting rod arrangement, a deflecting mirror, a diffraction grating or an interference filter. The material denoted by 140 is a material with a refractive index distinct from that of optical element 150. This may be a solid material, or even a void filled with air.

In this embodiment, optical element 150 may be used to direct only one, a plurality or all fields of view of the system.

In FIG. 6b, optical element 150 may also be, for example, a lens, placed on top of light sensitive element 301 to modify the fields of view 601, 602 and 603 such that their direction is at an angle to the normal of the display surface. This configuration is useful, for example, to implement a display panel with capture of stereoscopic images separated by stereoscopic angle 610 such that when displayed the two acquired stereoscopic images create a three-dimensional image for the viewer.

Embodiment 5

Figure 7:
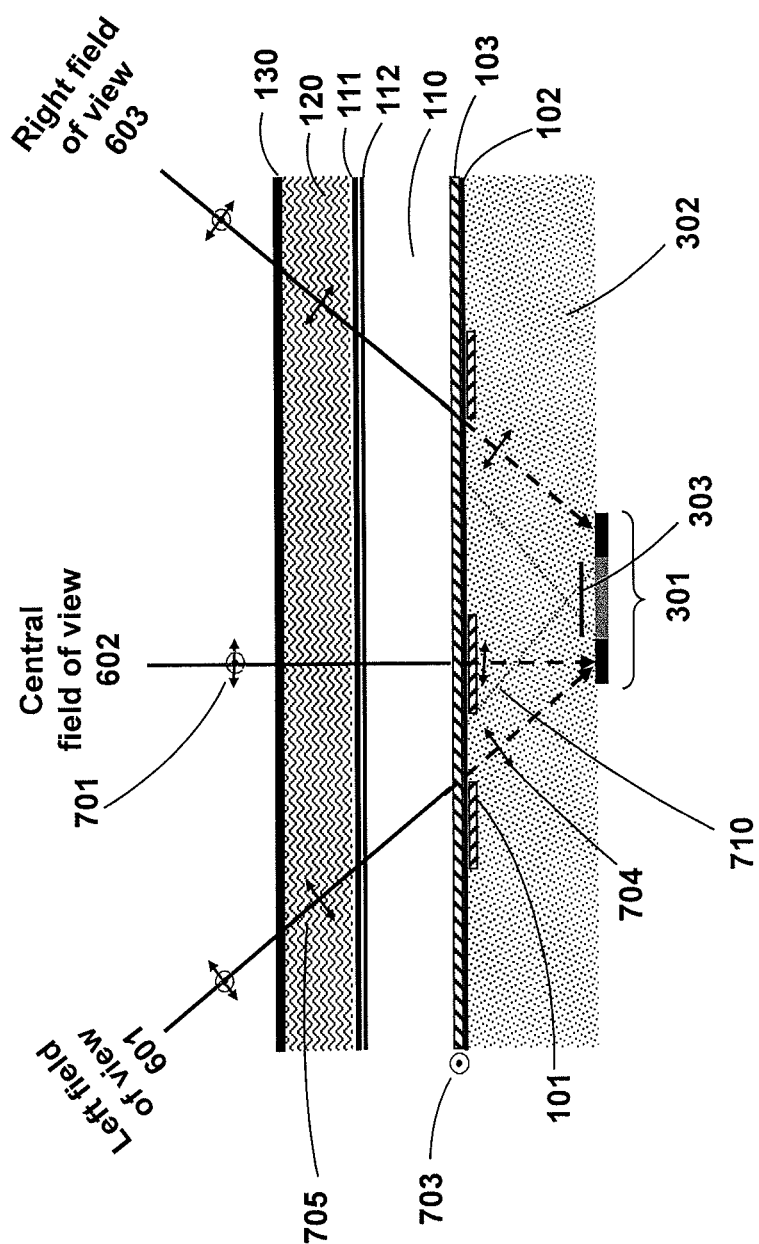
FIG. 7 is a cross-sectional view of exemplary electronic layers that constitute a fifth embodiment of the invention and left, central and right electrically switchable fields of view created on a sensor having non-homogeneous intrinsic sensitive regions.

FIG. 7 illustrates another embodiment in accordance with the present invention, which may be used in conjunction with any of the other embodiments. In this, inhomogeneity in the light sensitive element 301 is artificially created by shielding part of parts of it by an opaque light shield 303. By reducing its sensitive area, less light is therefore collected by light sensitive element 301, but nevertheless a sharper definition of its associated field(s) of view is obtained.

ITO electrode 101 or 111 may also be patterned such that only incident light from a distinct field of view impinges on a specific area only of light sensitive element 301 by using a configuration such that, for example, incident light from field of view 603 is contained only within the refraction limit 710 and therefore cannot impinge on another part of light sensitive element 301 apart from the one associated to field of view 603. This has the effect of restraining the field of view and therefore to have more flexibility in designing the optical configuration of the system.

Embodiment 6

Figure 8:
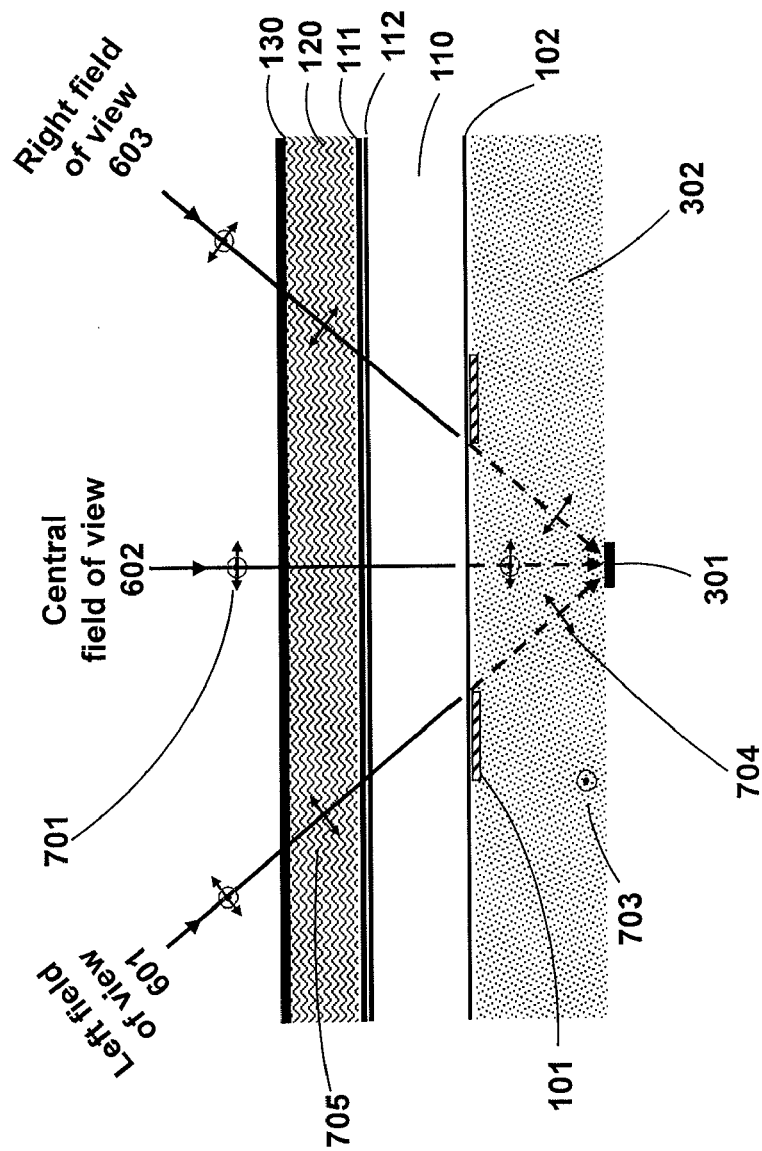
FIG. 8 is a cross-sectional view of exemplary electronic layers that constitute a sixth embodiment of the invention and left, central and right electrically switchable fields of view created utilizing polarisation-by-reflection of light through various electronic layers to act as a substitute for an in-cell polariser.

FIG. 8 illustrates another embodiment in accordance with the present invention. In this, light incident on light sensitive element 301 is polarisation shifted by liquid crystal element 110 while a polarisation-by-reflection of light going through the various electronic layers 302 acts as a substitute for the in-cell polariser. In this configuration an alignment layer 102 may be required to align the liquid crystal molecules at the lower surface of the liquid crystal element 110. This could be of a similar form to the alignment layer 112.

Nevertheless, the definition of the fields of view is bounded by the angular dependence of the polarisation-by-reflection phenomena.

If a central field of view 602, such as described in embodiment 3, was to be implemented, its relative intensity variation would be therefore inferred through a subtraction scheme between various states of activation of ITO regions that define fields of view 601, 603 adjacent to central field of view 602.

Embodiment 7

Figure 9:
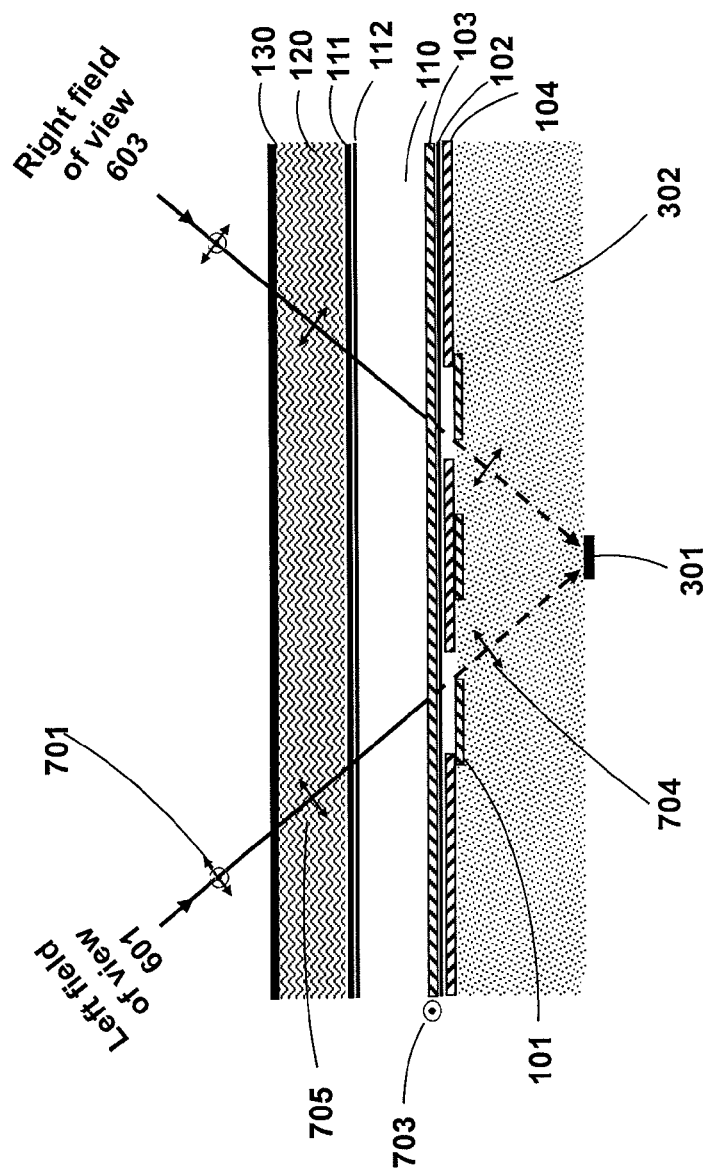
FIG. 9 is a cross-sectional view of exemplary electronic layers that constitute a seventh embodiment of the invention, wherein a patterned reflective electrode is used to create apertures above the ITO patterned layer.

FIG. 9 illustrates another embodiment in accordance with the present invention. This embodiment consists of implementing each of the embodiments described herein with a patterned reflective electrode 104 to create apertures above the ITO patterned layer 101 such that the fields of view are more clearly defined.

In FIG. 9 an example configuration is presented to which this embodiment is not restricted, but may be implemented, for example, as a single aperture layer or a multi-aperture layer or as a number of any of the formerly stated at different levels within the panel, such as described in GB0909542.5.

Embodiment 8

Figure 10:
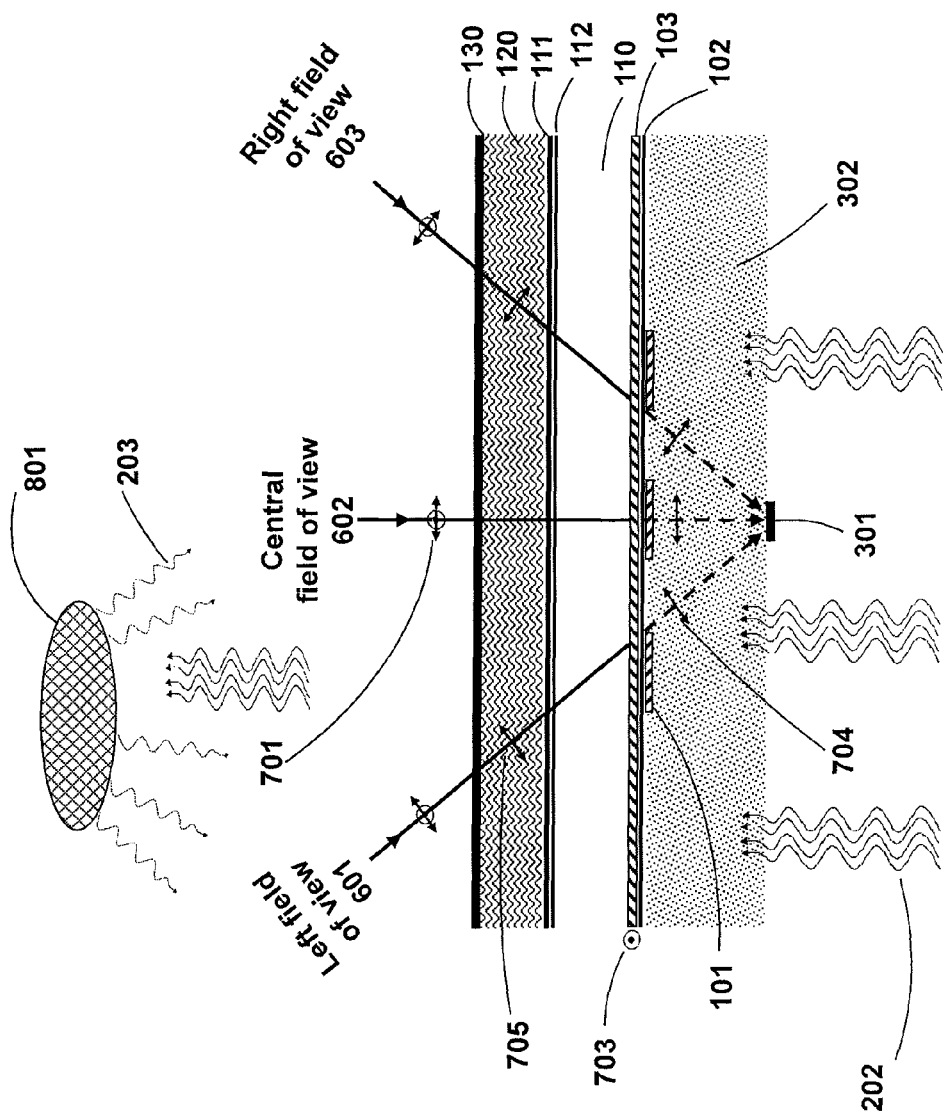
FIG. 10 is a cross-sectional view of exemplary electronic layers that constitute a eighth embodiment of the invention and left, central and right electrically switchable fields of view, wherein infrared radiation is transmitted through the liquid crystal cell and substitutes to illuminate objects above the display surface.

FIG. 10 illustrates another embodiment in accordance with the present invention. In this, a light source of infrared radiation 202 is transmitted through the liquid crystal cell substrates. The infrared radiation illuminates objects 801 above the display surface 130 such that scattered infrared radiation 203 may be incident on light sensitive element 301 without being affected by any optical arrangement of all embodiments in accordance with the present invention but embodiment 7.

When activating the switching of one or more fields of view such as, for example as depicted in FIG. 10, 601, 602 or 603, depending on the spectral response of the in-cell polariser, a specific spectral shielding of the one or more switched fields of view may be obtained to increase the signal-to-noise ratio in the response of light sensitive element 301 to the incident infrared radiation.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A display device for detecting light, comprising:
a liquid crystal display element including at least one electrode patterned thereon; and
at least one light sensitive element arranged behind the liquid crystal display element, wherein the at least one electrode, in conjunction with a voltage applied to the liquid crystal display element via the at least one electrode, is operative to change an optical transmission characteristic of the liquid crystal display element to define at least one field of view of the at least one light sensitive element relative to light transmitted through the liquid crystal display element, and
wherein the at least one electrode is patterned to define a geometry of the at least one field of view of the at least one light sensitive element.

2. The display device according to claim 1, wherein the liquid crystal display element is operative to polarization shift light incident on the at least one light sensitive element.

3. The device according to claim 1, further comprising a controller electrically coupled to the at least one electrode, the controller configured to apply a voltage to the at least one electrode to effect selection of the at least one field of view.

4. The device according to claim 1, further comprising an in-cell polarizing element arranged in the liquid crystal element.

5. The device according to claim 4, wherein the liquid crystal element is arranged over the in-cell polarizing element.

6. The device according to claim 4, wherein the in-cell polarizing element is arranged within the liquid crystal element.

7. The device according to claim 1, further comprising at least one electronic layer, wherein the at least one light sensitive element is embedded within the at least one electronic layer.

8. The device according to claim 1, further comprising a polarizing element arranged over the liquid crystal element, the polarizing element configured to linearly polarize light incident on the at least one light sensitive element.

9. The device according to claim 1, further comprising a polarizing element arranged under the liquid crystal element, the polarizing element configured to linearly polarize light incident on the at least one light sensitive element.

10. The device according to claim 1, wherein the at least one electrode is arranged such that a position and shape of the at least one electrode relative to the at least one light sensitive element induces the field of view of the at least one light sensitive element toward a predetermined direction.

11. The device according to claim 1, wherein when the liquid crystal element is in a first state, incident polarized light is either transmitted through the liquid crystal element and impinges on a surface of the at least one light sensitive element, or the incident polarized light blocked from passing through the liquid crystal element, wherein the at least one light sensitive element generates a scaled signal corresponding to a light input pixel.

12. The device according to claim 1, wherein the at least one electrode is patterned in a rectangular, square, circular, or elliptical shape.

13. The device according to claim 1, wherein the at least one electrode is a ground electrode and positioned adjacent to an edge of another electrode.

14. The device according to claim 13, wherein the ground electrode is patterned in a rectangular, square, circular, or elliptic shape.

15. The device according to claim 1, wherein the at least one electrode comprises a plurality of electrodes patterned in distinct regions above the at least one light sensitive element.

16. The device according to claim 15, wherein the distinct regions are electrically isolated from one another, and distinct fields of view of the at least one light sensitive element are electrically selectable based on a voltage applied to one or more of the distinct regions.

17. The device according to claim 16, wherein switching of each field of view is made on a pixel-by-pixel basis.

18. The device according to claim 1, wherein the at least one light sensitive element comprises a color filter.

19. The device according to claim 18, wherein adjacent light sensitive elements of the plurality of light sensitive elements have fields of view that co-extend to fields of view of adjacent light sensitive elements.

20. The device according to claim 1, further comprising an optical element arranged over the at least one light sensitive element, the optical element configured to modify a direction of the field of view of the at least one light sensitive element to be normal to a surface of the display device.

21. The device according to claim 20, wherein the optical element comprises a lens array.

22. The device according to claim 1, further comprising an optical element arranged over the at least one light sensitive element, the optical element configured to modify a direction of the field of view of the at least one light sensitive element to be at an angle to the normal of a surface of the display device.

23. The device according to claim 22, wherein the optical element comprises a lens.

24. The device according to claim 1, wherein the light sensitive element is responsive to non-homogeneous light.

25. The device according to claim 1, wherein the at least one electrode is patterned such that only incident light from a distinct field of view of the at least one light sensitive element impinges on a predetermined area of the at least one light sensitive element, and the incident light is contained within a total internal refraction limit such that the incident light does not impinge on another part of the at least one light sensitive element associated with a different field of view.

26. The device according to claim 1, further comprising a reflective electrode arranged over the at least one electrode, the reflective electrode patterned to include an aperture arranged over the at least one electrode.

27. The device according to claim 1, further comprising an infrared light source arranged below the at least one light sensitive element so as to transmit infrared radiation through the liquid crystal element and illuminate objects above a surface of the display device such that scattered infrared radiation is incident on the at least one light sensitive element.

28. The device according to claim 1, wherein the at least one electrode is arranged over the at least one light sensitive element.

29. The device according to claim 1, further comprising a light source, wherein the at least one light sensitive element is arranged between the light source and the liquid crystal display element.

30. A display device for detecting light incident within an electrically selectable field of view, comprising:
at least one electronic layer including at least one light sensitive element;
a liquid crystal element arranged over the at least one light sensitive element and including a plurality of molecules, wherein the liquid crystal element is operative to polarization shift light incident on the at least one light sensitive element based on an orientation of the plurality of molecules; and
at least one electrode operative to change an orientation of the plurality of molecules, the at least one electrode patterned to define a geometry of a field of view of the at least one light sensitive element,
wherein light passing through the at least one electronic layer undergoes polarization-by-reflection, and a field of view of the at least one light sensitive element is bounded by the angular dependence of the polarization-by-reflection.

* * * * *